(12) United States Patent
Starodoumov et al.

(10) Patent No.: US 8,411,352 B2
(45) Date of Patent: Apr. 2, 2013

(54) PULSED FIBER-MOPA WITH WIDELY-VARIABLE PULSE-DURATION

(75) Inventors: Andrei Starodoumov, Cupertino, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 393 days.

(21) Appl. No.: 12/542,490

(22) Filed: Aug. 17, 2009

(65) Prior Publication Data

US 2011/0038031 A1    Feb. 17, 2011

(51) Int. Cl.
*G02F 1/35*     (2006.01)
*G02F 2/02*     (2006.01)
*H01S 3/13*     (2006.01)

(52) U.S. Cl. ............ 359/326; 359/328; 359/341.1; 372/22

(58) Field of Classification Search .......... 359/326–332, 359/341.1, 341.3; 372/6, 21, 22, 98, 105
See application file for complete search history.

(56) References Cited

U.S. PATENT DOCUMENTS

| | | | |
|---|---|---|---|
| 5,339,183 A * | 8/1994 | Suzuki | 398/75 |
| 5,657,153 A | 8/1997 | Endriz et al. | |
| 5,790,300 A | 8/1998 | Zediker et al. | |
| 5,867,305 A * | 2/1999 | Waarts et al. | 359/337.12 |
| 6,041,072 A * | 3/2000 | Ventrudo et al. | 372/102 |
| 7,885,298 B2 * | 2/2011 | Munroe | 372/22 |
| 7,889,422 B2 * | 2/2011 | Furuya et al. | 359/326 |
| 2005/0067388 A1 | 3/2005 | Sun et al. | |
| 2008/0013163 A1 | 1/2008 | Leonardo et al. | |
| 2009/0185588 A1 | 7/2009 | Munroe | |
| 2010/0225897 A1 * | 9/2010 | Fermann et al. | 356/51 |

OTHER PUBLICATIONS

International Search Report and Written Opinion received for PCT Patent Application No. PCT/US2010/045625, mailed on May 22, 2012, 14 pages.
International Preliminary Report on Patentability received for PCT Patent Application No. PCT/US2010/045625, issued on May 30, 2012, 10 pages.
Lichtenstein, Norbert, "Industry Research Highlights: High Power Laser Diodes: From Telecom to Industrial Applications", IEEE LEOS Newsletter, Aug. 2007, pp. 33-38.
Starodoumov et al., "Hybrid Fiber MOPA-Bulk Amplifier System for Frequency Conversion", Proc. of Spie, vol. 6871, 2008, pp. 68710V.1-68710V.8.
Swiderski et al., "Diode-seeded Nanosecond Yb-doped Fiber Amplifier Operating at the Repetition Rate up to 500 kHz", The Institute of Engineering and Technology, Database Accession No. 10851829, 2009, 1 page.
Swiderski et al., "Pulsed Ytterbium-Doped Large Mode Area Double-Clad Fiber Amplifier in MOFPA Configuration", Opto-Electronics Review, vol. 15, No. 2, 2007, pp. 98-101.

* cited by examiner

*Primary Examiner* — Daniel Petkovsek
(74) *Attorney, Agent, or Firm* — Morrison & Foerster LLP

(57) ABSTRACT

Master oscillator power amplifier (MOPA) apparatus includes two seed-pulse sources coupled to a single fiber amplifier including one or more stages of amplification. One of the seed-pulse sources is a single-mode source generating pulses having a duration selectively variable between about 0.1 ns and 10 ns. The other seed-pulse source is a multi-mode source generating pulses having a duration selectively variable between about 1 ns and 10 μs. Selectively operating one or the other of the seed-pulse sources provides that the apparatus can deliver pulses selectively variable in a range between about 0.1 ns and 10 μs.

15 Claims, 2 Drawing Sheets

PULSED FIBER-MOPA WITH WIDELY-VARIABLE PULSE-DURATION

TECHNICAL FIELD OF THE INVENTION

The present invention relates to master oscillator power amplifier (MOPA) laser systems including fiber-amplifiers. The invention relates in particular to pulsed MOPAs in which pulse duration is selectively variable.

DISCUSSION OF BACKGROUND ART

Extra cavity frequency-converted pulsed solid state lasers are used extensively for material processing applications such as machining, drilling, and marking. Most commercially available, pulsed, solid-state lasers are Q-switched pulsed lasers. Q-switched pulsed lasers include a laser-resonator having a solid-state gain-element and selectively variable-loss device located therein. The laser resonator is terminated at one end thereof by a mirror that is maximally reflecting at a fundamental wavelength of the gain-element, and terminated at an opposite end thereof by a mirror that is partially reflecting and partially transmitting at the fundamental wavelength. Such a laser is usually operated by continuously optically pumping the gain element while periodically varying (switching) the loss caused by the variable loss device (Q-switch) between a value that will prevent lasing in the resonator and a value that will allow lasing in the resonator. While lasing is allowed in the resonator, laser radiation is delivered from the partially transmitting mirror as a laser pulse.

The pulse repetition frequency (PRF) of a Q-switched solid-state laser is determined by the frequency at which the Q-switch is switched. The pulse duration is determined for any particular gain-medium by factors including the length of the resonator, the transmission of the partially-transmitting mirror, losses in the Q-switch in a "lasing-allowed" condition, the optical pump power, and the PRF. A pulse repetition rate and pulse duration that are optimum for an operation on any one material will usually not be optimum for another operation or another material. Accordingly, an "ideal" pulsed laser would have independently variable PRF and pulse-duration to allow an optimum combination to be selected for most operations on most materials.

One type of laser system in which the PRF can be varied without a variation in pulse duration is a fiber-based MOPA in which seed pulses are generated by a master oscillator in the form of a modulated, edge-emitting semiconductor laser (diode-laser) and amplification is provided by a fiber-amplifier. A fiber-amplifier has relatively high gain, for example between about 13 decibels (dB) and 30 dB. This, combined with a low saturation power, allows a variety of low-power diode-laser seed sources to be used. Such a fiber MOPA can be operated at PRFs from less than 100 kilohertz (kHz) to 5 Megahertz (MHz) or greater, with pulse durations selected between about 0.1 nanosecond (ns) and about 1 microsecond ($\mu$s).

A significant problem in fiber-amplifiers is created by non-linear effects in fibers which limit peak power and affect the spectral characteristics of the optical pulses. For harmonic generation at nanosecond pulses, spectrally-narrow light with a bandwidth between about 0.5 nanometers (nm) and 1.0 nm is required. Stimulated Raman scattering (SRS), stimulated Brillouin scattering (SBS), and spectral broadening of nanosecond pulses due to four-wave mixing (FWM) in fibers significantly narrow the available space of optical parameters acceptable for frequency conversion.

Stimulated Raman scattering (SRS) limits the peak power in typical all-fiber systems with core diameters below 30 $\mu$m (so called LMA fibers) although larger diameters of up to 100 $\mu$m are also possible using specially designed fibers (so called photonic-crystal fibers and leaky-mode fibers). SRS is the only power-limiting factor for broadband, for example greater than 1.0 nm bandwidth, IR nanosecond pulses. Attempts to narrow the spectral bandwidth using a single-frequency seed source encountered a build-up of stimulated Brillouin scattering (SBS) resulting in optical damage of fiber components.

It is known that for long optical pulses, for example pulses having a duration greater than 20 ns with a bandwidth much broader than for SBS, for example between about 0.20 picometers (pm) and 0.25 pm (between about 40 and 50 MHz), the threshold power for SBS grows proportionally to the signal spectral width. This is why a common approach for SBS suppression in long pulses is to broaden the pulse bandwidth to be much larger than the SBS bandwidth of about 0.2 pm while keeping the pulse bandwidth below about 1 nm that is appropriate for frequency conversion. However, spectral broadening of nanosecond pulses due to four-wave mixing in fibers transfer the energy from the narrow spectral peak to the spectral wings at pulse peak powers above 100 W (FIG. 1). This effect reduces frequency-conversion efficiency in all-fiber systems compared to solid-state lasers.

Another way to reduce SBS is to use pulses shorter than the SBS build-up time in fibers, which is typically close to 20 ns. For pulses having a duration less than 20 ns, SBS occurs in a transient regime with a smaller gain-factor.

There are two common approaches to generate pulses with variable length and pulse repetition rate. The first approach uses a directly modulated=diode-laser as a seed source. Such an approach is, in general, less expensive, and provides high peak power, for example greater than 1 Watt (W) from the seed laser. A major disadvantage of this approach is that to provide short pulses having a duration of less than 10 ns a short cavity length, for example less than about 10 millimeters (mm), is required. This, in turn, results in a single-frequency or "few-frequency mode" operation that favors SBS and limits the peak power in fiber-amplifiers. For this reason, this approach is limited to short pulses (duration less than about 10 ns), where SBS exhibits a reduced gain. Using broadband reflectors in the cavity and generating more modes helps to reduce SBS but immediately results in stronger broadening of the spectrum due to FWM, making frequency-conversion inefficient.

The second approach uses a continuous wave (CW) optical source or pulsed optical source with long pulses, modulated by an external modulator. In such a system, a seed source could be a diode-laser, a solid-state laser, a fiber laser, or a source generating amplified spontaneous emission (ASE source), such as a superluminescent LED, while a typical modulator is an electro-optical crystal in the waveguide Mach-Zehnder configuration or a semiconductor optical amplifier.

On one hand, such an approach provides less peak power (typically less than 100 mW) after modulation compared with that available from a directly modulated diode. On the other hand this approach allows generation of pulses of any length and repetition rate with a spectrum determined by an appropriately designed seed laser. For example, a diode seed laser may have a low noise operation when a fiber Bragg grating (FBG) written in a fiber placed in 1-2 m from a diode-laser chip provides an output coupler for the diode-laser cavity. With a typical FBG bandwidth of between about 0.01 nm and 1.0 nm, such a diode-laser will have a much broader spectrum than the SBS bandwidth, which helps to suppress SBS. However, due to mode-beating such a source exhibits pulse-to-pulse fluctuations, especially when operating with short pulses of less than 10 ns duration. The second approach is therefore limited to pulse durations of greater than about 10 ns.

For many applications it would be desirable to have a fiber MOPA with a frequency conversion stages operating at any pulse duration between about 0.1 ns and 1 microsecond.

SUMMARY OF THE INVENTION

In one aspect of the present invention optical apparatus comprises an optical amplifier including one or more fiber-amplification stages. A single-mode source of optical pulses is provided and arranged to deliver optical pulses having a pulse-duration selectable in a first range of pulse durations including pulse durations between a first duration and a second duration. A multi-mode source of optical pulses is provided and arranged to deliver optical pulses having a pulse-duration selectable in a second range of pulse durations including pulse durations between about a third duration and a fourth duration, where the fourth duration is greater than the second duration. Pulses from the few mode and multi-mode pulse sources can be selectively coupled to the optical amplifier, such that the apparatus can deliver optical pulses having a duration selectable in a third range of durations between the first duration and the fourth duration.

In a preferred embodiment of the invention the first, second, third and forth durations are respectively about 0.1 ns, 10 ns, 1 ns, and 1000 ns. Accordingly, in this embodiment of the inventive apparatus can deliver pulses having a duration selectable in a range between about 0.1 ns and 1000 ns (1 μs).

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
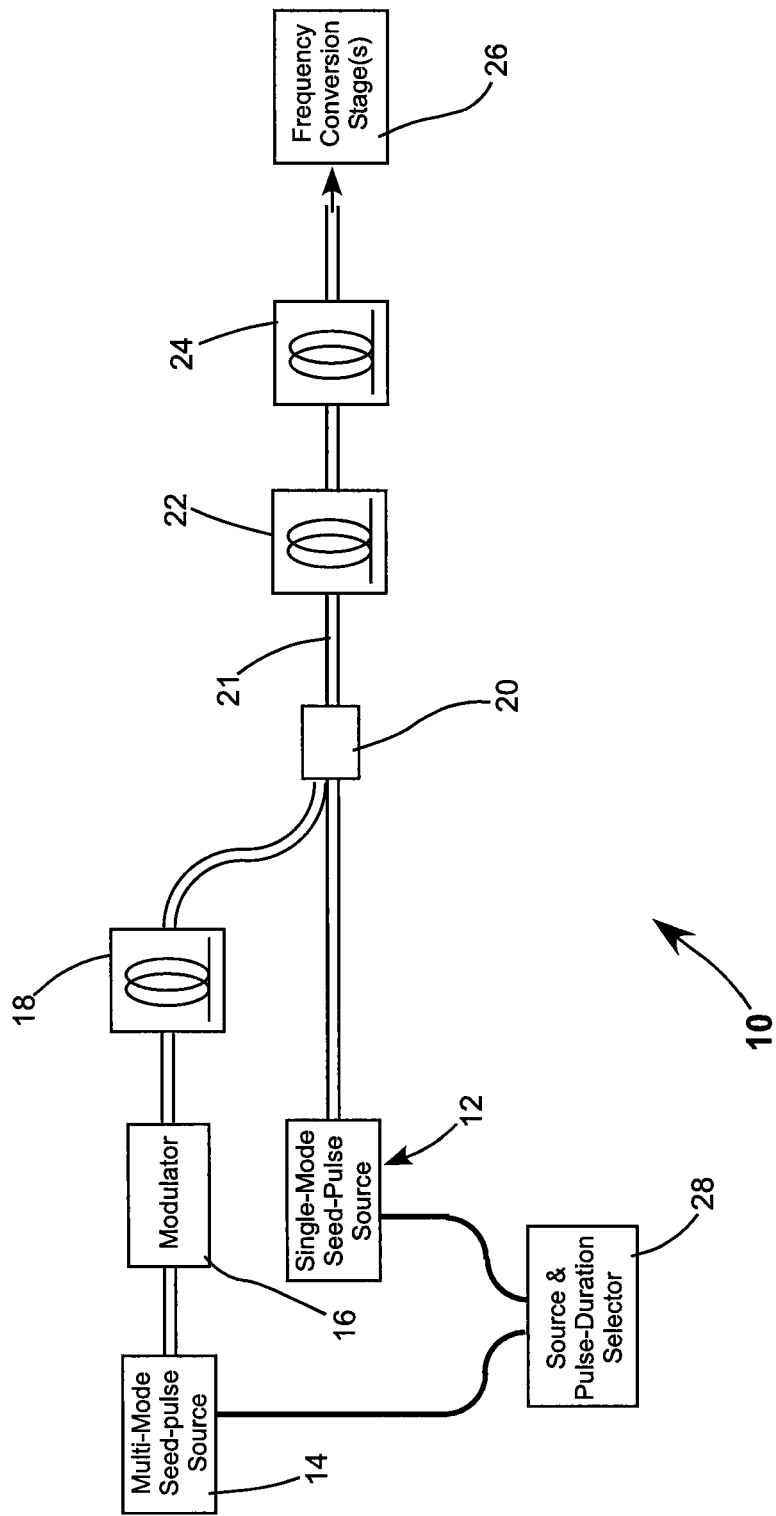
FIG. 1 schematically illustrates one preferred embodiment of MOPA apparatus in accordance with the present invention having a single mode seed pulse source including a contrast-enhancing modulator and a multi-mode seed-pulse source with both sources coupled to a fiber amplifier including two stages of fiber amplification, a pulse duration and source selector cooperative with the seed pulse sources to select the source and duration of pulses delivered to the fiber amplifier, and a frequency converter for changing the wavelength of amplified pulses.

Referring now to the drawings, wherein like components are designated by like reference numerals, FIG. 1 schematically illustrates one preferred embodiment 10 of a fiber-MOPA laser apparatus in accordance with the present invention. Apparatus 10 includes two optical sources 12 and 14. The optical sources are connected via a coupler 20 to one or more fiber-amplifier stages. Two stages 22 and 24 are depicted in FIG. 1 by way of example. The amplifier output is directed to one or more frequency conversion stages 26 for converting the fundamental wavelength of the amplified pulses to a different wavelength such as the second, third, or fourth, harmonic wavelength. Those skilled in there to which the present invention relates will recognize that in any multistage amplifier arrangement it is advisable to provide an optical isolator between stages to prevent feedback for one stage into a prior stage or from an amplifier stage back to a source. Isolators are not shown in FIG. 1 for simplicity of illustration. Non-linear crystals can be used for the frequency conversion stage.

Optical source 12 is a single-mode pulsed source which provides optical pulses having a duration selectively variable in a relatively short-duration range, for example between about 0.1 ns to 10 ns. Here "single-mode" source is intended include a source that operates in one or a very few (four or less) modes. However, pure single mode operation is preferred. Optical source 12 can be a single-mode (single-frequency) directly modulated diode-laser, in particular an extended cavity diode-laser with distributed feedback (DFB) provided by distributed Bragg grating (DBG) written in an optical fiber (detail not shown). In such a directly modulated diode-laser, there is a small frequency sweep (chirp) from the beginning of the pulse to the end of the pulse. This frequency chirp helps to increase SBS threshold. Single-mode operation of source 12 also helps to reduce FWM in fiber-amplifiers and provides good pulse stability. A combination of a CW single-frequency laser with an external modulator can be used instead of a directly modulated diode-laser for source 12.

Optical source 14 is a multiple-longitudinal-mode (multiple-frequency) pulsed laser providing radiation having a spectral bandwidth much broader, for example at least about ten-times broader, than the SBS bandwidth of amplifier fibers but less than about 1 nm. Preferably, the spectral bandwidth (FWHM) is between about 50 pm and 1 nm. Laser 14 provides optical pulses having a duration selectively variable in a range of durations longer than the range of laser 12, for example between about 1 ns to 1000 ns (1 μs). For such a broadband source, the SBS threshold grows proportional to the spectral bandwidth of the pulses. Here it should be noted that there can be some overlap between the pulse duration ranges of sources 12 and 14.

Optionally, the output of the source can be modulated by a modulator 16 to increase contrast between pulses and background light. This technique is described in detail in U.S. patent application Ser. No. 12/132,449, filed Jun. 3, 2008, assigned to the assignee of the present invention and the complete disclosure of which is hereby incorporated by reference.

Further it may be necessary to locate either an amplifier or an attenuator between either of sources 12 and 14 and the coupler, depending on the sources and other components, to approximately match average powers from both sources at the coupler. By way of example, in apparatus 10, a fiber-amplifier 18 is included between source 14 and the coupler to compensate extra loss caused by optical modulator 16.

An extended cavity diode-laser with an output mirror based on a fiber Bragg grating having a bandwidth of more than 0.01 mn and placed at least 1 meter from the diode chip is one example of a laser suitable for multimode source 14. Another example of a laser suitable for multimode source 14 is an amplified spontaneous emission (ASE) fiber-laser including a spectral filter (for example, a fiber Bragg grating), which narrows the bandwidth of ASE source while keeping the coherence length of the source short. Such an ASE fiber-laser having short coherence length would help to reduce FWM and increase SBS threshold in fiber-amplifiers 22 and 24. It is preferable that pulses from both sources have the same nominal wavelength (center wavelength)

Coupler 20 combines light from each of sources in one fiber 21 and delivers it to amplifier stages 22 and 24. Preferably coupler 20 is a fused-fiber coupler or a fiber-pigtailed micro-optics based coupler. Only one of sources delivers pulses to fiber amplifiers 22 and 24 at any time depending on the desired pulse duration. The source and pulse duration is selected by user input to a selector 28, which can be a component of a more universal control-electronics arrangement for operating parameters of apparatus 10. Alternative possible coupling arrangements include such a mechanical switch between fiber output ports of each source, an electro-optical modulators such as a Mach-Zehnder (MZ) interferometer formed in a lithium niobate ($LiNbO_3$) crystal, and an acousto-optic (A-O) modulator with two input ports an one output port.

Figure 2:
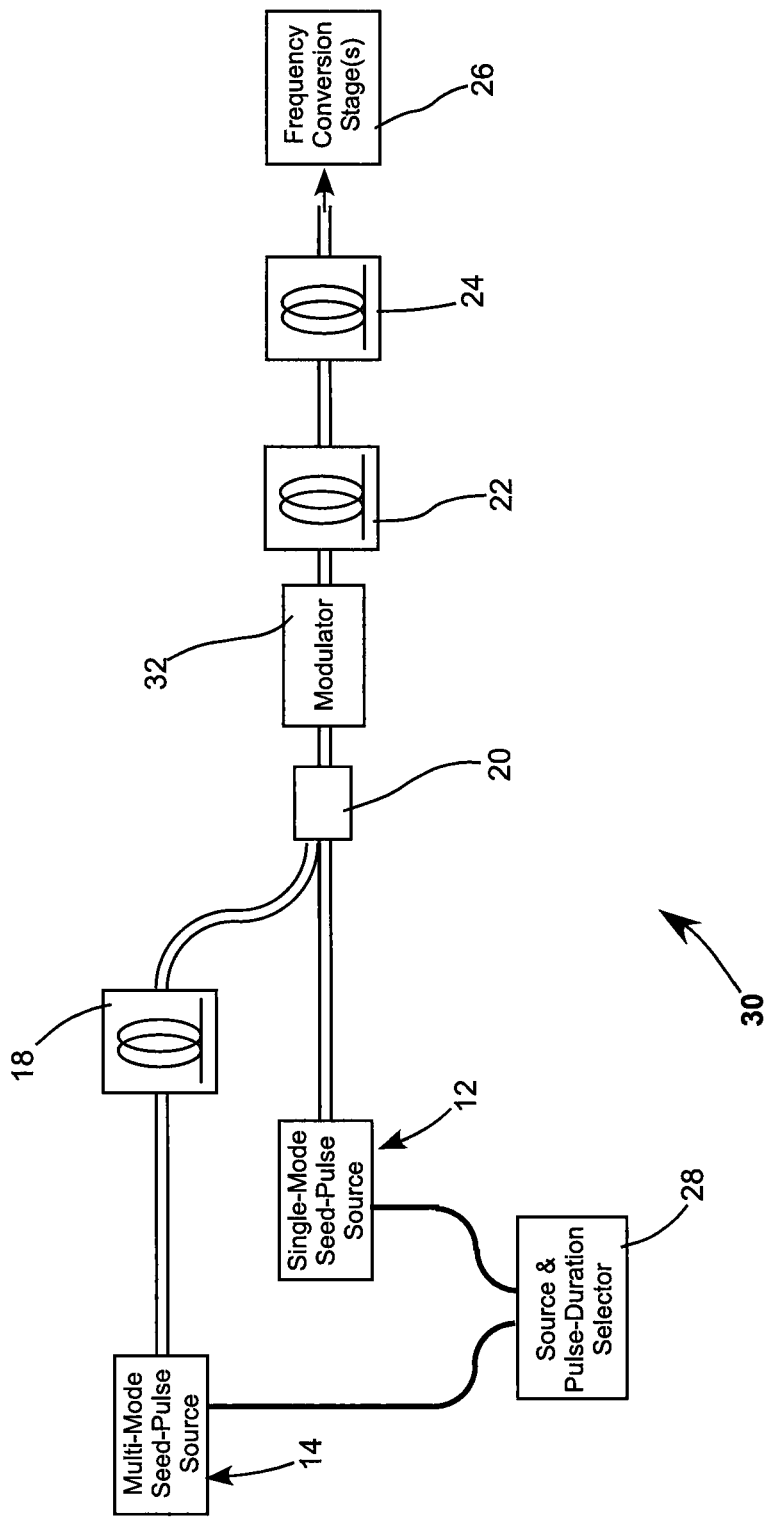
FIG. 2 schematically illustrates another preferred embodiment of MOPA apparatus in accordance with the present invention, similar to the apparatus of FIG. 1, but wherein the contrast enhancing monitor of the single-mode seed pulse source is replaced by a contrast enhancing modulator in the fiber amplifier.

FIG. 2 schematically illustrates another preferred embodiment 30 of a fiber-MOPA laser apparatus in accordance with the present invention. Apparatus 30 is similar to apparatus 10 of FIG. 1, with an exception that modulator 16 in the single mode source arm of apparatus 10 is omitted and an optional modulator 32 is located between coupler 20 and fiber-amplifier stage 22. Modulator 32 provides contrast enhancement for pulses from either of sources 12 and 14, or could provide additional enhancement if either source included a contrast enhancing monitor. It should be noted, however, that the contrast-enhancement action of the monitor reduces the duration of pulses the contrast of which is being enhanced. This should be taken into account when selecting a pulse-duration from either source. Modulator 32 can also be used for temporally shaping pulses from either source.

The present invention is described above with reference to preferred embodiments thereof. The invention however is not limited to the embodiments described and depicted herein. Rather the invention is limited only by the claims appended hereto.

What is claimed is:

1. A laser system for generating a pulsed output comprising:
    a single mode source for generating optical seed pulses having a first bandwidth;
    a multimode source for generating optical seed pulses having a second bandwidth larger than the first bandwidth;
    a fiber amplifier for selectively amplifying pulses from one of either the single or multimode sources;
    a frequency conversion stage for converting the frequency of the amplified pulses; and
    a controller for selectively activating one of the two sources to generate pulses having a desired repetition rate, wherein the single mode source can be selected for pulses having a duration in a first range and the multimode mode source can be selected for pulses having a duration in a second range, with the first range encompassing pulse durations shorter than the second range.

2. The apparatus of claim 1, wherein the single-mode optical-pulse source includes a single-mode diode-laser.

3. The apparatus of claim 2, wherein the single-mode diode-laser is a directly modulated diode-laser.

4. The apparatus of claim 1, wherein the multi-mode optical-pulse source includes an extended cavity diode-laser.

5. The apparatus of claim 4, wherein the extended cavity diode-laser has a cavity length about equal to or greater than 1 meter.

6. The apparatus of claim 4, wherein the extended cavity diode-laser is a directly modulated diode-laser.

7. The apparatus of claim 1, wherein pulses delivered by the multimode source have a spectral bandwidth between about 50 picometers and 1 nanometer.

8. A laser system as recited in claim 1, wherein the beandwith of the pulses generated by the multimode source is at least 50 picometers.

9. A laser system as recited in claim 8, wherein the duration of the pulses generated by the single mode source ranges from about 0.1 nanoseconds to 10 nanoseconds and the duration of the pulses generated by the multimode source ranges from about 1 nanosecond to about 1000 nanoseconds.

10. A laser system for generating a pulsed output comprising:
    a single mode source for generating optical pulses;
    a multi-mode source for generating optical pulses having a bandwidth of at least 50 picometers;
    a fiber amplifier for selectively amplifying pulses from one of either the first or second sources;
    a frequency conversion stage for converting the frequency of the amplified pulses; and
    a controller for selectively activating one of the two sources to generate pulses having a desired repetition rate and duration wherein single mode source can be selected for pulses having a duration in a first range and the multimode mode source can be selected for pulses having a duration in a second range, with the first range encompassing pulse durations shorter than the second range.

11. A laser system as recited in claim 9, wherein the duration of the pulses generated by the single mode source ranges from about 0.1 nanoseconds to 10 nanoseconds and the duration of the pulses generated by the multimode source ranges from about 1 nanosecond to about 1000 nanoseconds.

12. A laser system as recited in claim 9, wherein the controller causes the selected source to generate pulses having a desired repetition rate, with the source and the duration of the pulses being selected to minimize scattering in the fiber amplifier and maximize conversion efficiency in the frequency conversion stage.

13. A method of operating a laser system, said laser system including a first laser generating single mode optical seed pulses having a first bandwidth and a second laser generating multimode optical seed pulses having a second bandwidth larger than the first bandwidth, said laser system including a fiber amplifier for selectively amplifying pulses from one of either the first or second lasers, said laser system including a frequency conversion stage for converting the frequency of the amplified pulses, said method comprising;
    selectively activating the first laser to generate single mode pulses having a duration in a first range and, alternatively, selectively activating the second laser to generate multimode pulses having a duration in a second range, with the first range encompassing pulse durations shorter than the second range.

14. A method as recited in claim 13, wherein the bandwidth of the pulses generated by the second multimode laser is at least 50 picometers.

15. A method as recited in claim 13, wherein the duration of the pulses generated by the first single mode laser ranges from about 0.1 nanoseconds to 10 nanoseconds and the duration of the pulses generated by the second multimode laser ranges from about 1 nanosecond to about 1000 nanoseconds.

\* \* \* \* \*